(12) United States Patent
Kernick, III et al.

(10) Patent No.: US 8,829,100 B2
(45) Date of Patent: Sep. 9, 2014

(54) REINFORCED AMORPHOUS POLYMER COMPOSITION

(75) Inventors: William A. Kernick, III, Niskayuna, NY (US); Yanjun Li, Shanghai (CN); Lihua Pan, Shanghai (CN)

(73) Assignee: Sabic Innovative Plastics IP B.V. (NL)

( * ) Notice: Subject to any disclaimer, the term of this patent is extended or adjusted under 35 U.S.C. 154(b) by 837 days.

(21) Appl. No.: 11/612,733

(22) Filed: Dec. 19, 2006

(65) Prior Publication Data

US 2008/0146707 A1    Jun. 19, 2008

(51) Int. Cl.
*C08K 7/14*    (2006.01)
*C08K 5/11*    (2006.01)
*C08K 5/52*    (2006.01)
*C08L 81/06*    (2006.01)
*C08L 79/08*    (2006.01)

(52) U.S. Cl.
CPC . *C08L 81/06* (2013.01); *C08L 79/08* (2013.01)
USPC .......... 524/494; 524/140; 524/310; 524/500; 524/537; 524/538; 524/539

(58) Field of Classification Search
USPC ............... 264/572, 328.1, 331.11; 360/3; 428/473.5; 524/136, 140, 141, 143, 524/167, 284, 310, 401, 425, 445, 447, 449, 524/473.5, 494, 537, 538; 525/418, 420, 525/425, 433, 436; 527/287
See application file for complete search history.

(56) References Cited

U.S. PATENT DOCUMENTS

| | | | |
|---|---|---|---|
| 3,634,355 A | 1/1972 | Barr et al. | |
| 3,803,085 A | 4/1974 | Takehoshi et al. | |
| 3,847,867 A | 11/1974 | Heath et al. | |
| 3,852,242 A | 12/1974 | White | |
| 3,905,942 A | 9/1975 | Takekoshi et al. | |
| 3,972,902 A | 8/1976 | Heath et al. | |
| 3,983,093 A | 9/1976 | Williams, III et al. | |
| 4,008,203 A | 2/1977 | Jones | |
| 4,108,837 A | 8/1978 | Johnson et al. | |
| 4,175,175 A | 11/1979 | Johnson et al. | |
| 4,176,222 A | 11/1979 | Cinderey et al. | |
| 4,305,863 A | 12/1981 | Adachi et al. | |
| 4,390,647 A | 6/1983 | Girgis | |
| 4,443,591 A | 4/1984 | Schmidt et al. | |
| 4,455,410 A | 6/1984 | Giles | |
| 4,548,997 A | 10/1985 | Mellinger et al. | |
| 5,153,263 A | 10/1992 | Liu et al. | |
| 5,543,448 A | 8/1996 | Laughner | |
| 5,759,687 A | 6/1998 | Arpin et al. | |
| 5,922,806 A | 7/1999 | Blum et al. | |
| 5,961,915 A | 10/1999 | Toyouchi et al. | |
| 6,111,031 A | 8/2000 | Puyenbroek et al. | |
| 6,753,365 B2 * | 6/2004 | Brown et al. | 524/123 |
| 6,759,474 B1 | 7/2004 | Keener et al. | |
| 2001/0047050 A1 | 11/2001 | Oyamada et al. | |
| 2003/0162871 A1 * | 8/2003 | Saito | 524/148 |
| 2003/0171469 A1 * | 9/2003 | Brown et al. | 524/284 |
| 2005/0038145 A1 | 2/2005 | Gallucci et al. | |
| 2005/0048299 A1 * | 3/2005 | Gallucci et al. | 428/473.5 |
| 2005/0054763 A1 | 3/2005 | Kobayashi et al. | |
| 2005/0139308 A1 | 6/2005 | Aldea et al. | |

FOREIGN PATENT DOCUMENTS

| | | |
|---|---|---|
| EP | 0485644 A1 | 5/1992 |
| WO | 03087226 A1 | 10/2003 |

OTHER PUBLICATIONS

International Search Report for International Application No. PCT/US2007/075845; Mailed Dec. 14, 2007, 6 pages.
Written Opinion for International Application No. PCT/US2007/075845, Mailed Dec. 14, 2007, 8 pages.
ASTM D638, Standard Test Method for Tensile Properties of Plastics, 15 pages.
Microglas Glass Flake Microglas Fleka for Polymer Reinforcement; retrieved from the Internet http://www.ngfeurope.com, http://www.ngfcanada.com, (Jun. 28, 2001).

* cited by examiner

*Primary Examiner* — Ling Choi
*Assistant Examiner* — Chun-Cheng Wang
(74) *Attorney, Agent, or Firm* — Cantor Colburn LLP; Diderico van Eyl

(57) ABSTRACT

A thermoplastic composition comprises: a high heat thermoplastic resin, glass fiber, and a particulate glass filler. The particulate glass filler, prior to forming the composition, has a coating comprising an aminosilane and a urethane groups.

42 Claims, No Drawings

REINFORCED AMORPHOUS POLYMER COMPOSITION

BACKGROUND OF INVENTION

Disclosed herein is a reinforced amorphous polymer composition. In particular a reinforced amorphous polymer composition having improved weld line strength is disclosed.

Plastic materials (polymers) able to withstand high temperatures (having a glass transition temperature (Tg) greater than 180° C.) are useful in a wide variety of applications. For example, it has long been desired to use reinforced high temperature plastic materials to replace metal in many articles. To be successful the reinforced plastic material must have good mechanical properties and excellent dimensional stability, even at high temperatures. For example, such plastic materials need enough weldline strength to resist breakage during secondary operations. A weldline is formed in an area where two or more molten polymer fronts meet during the production of an article. For example, weldlines can be formed when molten polymer is injected into a mold from two different locations. A weldline is usually the weakest area in a molded article and generally is the first to fail when the article is exposed to force.

Accordingly there is a need for polymer compositions which are able to withstand high temperatures and have high weldline strength.

BRIEF DESCRIPTION OF THE INVENTION

The foregoing need is addressed by a thermoplastic composition comprising: a high heat thermoplastic resin, glass fiber, and a particulate glass filler. The particulate glass filler, prior to forming the composition, has a coating comprising urethane groups and an aminosilane.

In one embodiment, a thermoplastic composition comprises a high heat thermoplastic resin, glass fiber, and a particulate glass filler. The particulate glass filler, prior to forming the composition, has a coating comprising urethane groups and an aminosilane. The high heat thermoplastic resin, prior to forming the composition, has end groups reactive with or compatible with the urethane groups, aminosilane, or a combination thereof under melt mixing conditions.

In one embodiment, a thermoplastic composition comprises a high heat thermoplastic resin, glass fiber, and a particulate glass filler. The particulate glass filler, prior to forming the composition, has a coating comprising urethane groups and an aminosilane. The high heat thermoplastic resin, prior to forming the composition, has anhydride end groups, amino end groups, or a combination thereof.

Also disclosed herein are methods of making the foregoing compositions and articles comprising the foregoing compositions.

DETAILED DESCRIPTION OF THE INVENTION

The thermoplastic compositions described herein have a remarkably increased weld line strength when compared to comparable compositions in which the particulate glass filler has a coating that does not comprise a urethane group and an aminosilane.

Without being bound by theory it is believed that when the particulate glass filler having a coating comprising urethane groups and an aminosilane coupling agent is melt-kneaded with the high heat thermoplastic resin, a graft copolymer is formed in the interface between the high heat thermoplastic resin and the particulate glass filler. This graft polymer is believed to be a product of the reaction of the end groups contained in the coating with the end groups of the high heat thermoplastic resin. Additionally it may also be that the aminosilane of the coating also reacts with the end groups of the high heat thermoplastic resin to form a copolymer. The presence of the graft copolymer improves mechanical properties by improving adhesion between the resin and the glass flake.

The terms "first," "second," and the like, "primary," "secondary," and the like, as used herein do not denote any order, quantity, or importance, but rather are used to distinguish one element from another. The terms "a" and "an" do not denote a limitation of quantity, but rather denote the presence of at least one of the referenced item. "Optional" or "optionally" means that the subsequently described event or circumstance may or may not occur, and that the description includes instances where the event occurs and instances where it does not.

The term "alkyl" is intended to include both $C_{1-30}$ branched and straight-chain, unsaturated aliphatic hydrocarbon groups having the specified number of carbon atoms. Examples of alkyl include but are not limited to, methyl, ethyl, n-propyl, i-propyl, n-butyl, s-butyl, t-butyl, n-pentyl, s-pentyl, n- and s-hexyl, n-and s-heptyl, and, n- and s-octyl.

The term "alkenyl" is defined as a $C_{2-30}$ branched or straight-chain unsaturated aliphatic hydrocarbon groups having one or more double bonds between two or more carbon atoms. Examples of alkenyl groups include ethenyl, propenyl, butenyl, pentenyl, hexenyl, heptenyl, octenyl and nonenyl and the corresponding $C_{2-10}$ dienes, trienes and quadenes.

The term "alkynyl" is defined as a $C_{2-10}$ branched or straight-chain unsaturated aliphatic hydrocarbon groups having one or more triple bonds between two or more carbon atoms. Examples of alkynes include ethynyl, propynyl, butynyl, pentynyl, hexynyl, heptynyl, octynyl and nonynyl.

The term "substituted" means that one or more hydrogens on the molecule, portion of the molecule, or atom are replaced with substitution groups provided that an atom's normal valency is not exceeded, and that the substitution results in a stable compound. Such "substitution groups" may be selected from the group consisting of: —OR, —NR'R, —C(O)R, —SR, -halo, —CN, —NO$_2$, —SO$_2$, phosphoryl, imino, thioester, carbocyclic, aryl, heteroaryl, alkyl, alkenyl, bicyclic and tricyclic groups. When a substitution group is a keto (i.e., =O) group, then 2 hydrogens on the atom are replaced. Keto substituents are not present on aromatic moieties. The terms R and R' refer to alkyl groups that may be the same or different.

Thus, for example, the term "substituted $C_{1-10}$ alkyl" refers to alkyl moieties containing saturated bonds and having one or more hydrogens replaced by, for example, halogen, carbonyl, alkoxy, ester, ether, cyano, phosphoryl, imino, alkylthio, thioester, sulfonyl, nitro, heterocyclo, aryl, or heteroaryl.

The terms "halo" or "halogen" as used herein refer to fluoro, chloro, bromo and iodo.

The term "monocyclic" as used herein refers to groups comprising a single ring system. The ring system may be aromatic, heterocyclic, aromatic heterocyclic, a saturated cycloalkyl, or an unsaturated cycloalkyl. The monocyclic group may be substituted or unsubstituted. Monocyclic alkyl groups may have 5 to 12 ring members.

The term "polycyclic" as used herein refers to groups comprising multiple ring systems. The rings may be fused or unfused. The polycyclic group may be aromatic, heterocyclic, aromatic heterocyclic, a saturated cycloalkyl, an unsaturated cycloalkyl, or a combination of two or more of the foregoing. The polycyclic group may be substituted or unsubstituted. Polycyclic groups may have 6 to 20 ring members.

The term "aryl" is intended to mean an aromatic moiety containing the specified number of carbon atoms, such as, but not limited to phenyl, tropone, indanyl or naphthyl.

The terms "cycloalkyl" are intended to mean any stable ring system, which may be saturated or partially unsaturated. Examples of such include, but are not limited to, cyclopropyl, cyclopentyl, cyclohexyl, norbornyl, bicyclo[2.2.2]nonane, adamantyl, or tetrahydronaphthyl(tetralin).

As used herein, the term "heterocycle" or "heterocyclic system" is intended to mean a stable 5- to 7-membered monocyclic or 7- to 10-membered bicyclic heterocyclic ring which is saturated, partially unsaturated, unsaturated or aromatic, and which consists of carbon atoms and 1 to 4 heteroatoms independently selected from the group consisting of N, O and S and including any bicyclic group in which any of the above-defined heterocyclic rings is fused to a benzene ring. The nitrogen and sulfur heteroatoms may optionally be oxidized. The heterocyclic ring may be attached to its pendant group at any heteroatom or carbon atom that results in a stable structure. In this regard, a nitrogen in the heterocycle may optionally be quaternized. When the total number of S and O atoms in the heterocycle exceeds 1, then these heteroatoms are not adjacent to one another. In some embodiments the total number of S and O atoms in the heterocycle is not more than 1.

As used herein, the term "aromatic heterocyclic system" is intended to mean a stable 5- to 7-membered monocyclic or 7- to 10-membered bicyclic heterocyclic aromatic ring which consists of carbon atoms and from 1 to 4 heteroatoms independently selected from the group consisting of N, O and S. In some embodiments the total number of S and O atoms in the aromatic heterocycle is not more than 1.

All ASTM tests are from the 2003 edition of the Annual Book of ASTM Standards unless otherwise indicated.

High heat thermoplastic resins are defined herein as having glass transition temperatures greater than or equal to 180° C. In some embodiments the high heat thermoplastic resin is capable of reacting with or is compatible with the urethane groups, aminosilane or a combination thereof. "Compatible with" as used herein refers to having chemical characteristics, physical characteristics or both chemical and physical characteristics sufficient to interact physically, chemically or a combination thereof, in a way such that the weld line strength is increased relative to compositions containing particulate glass fiber free of the combination of urethane groups and an aminosilane. Exemplary chemical interactions include, but are not limited to, covalent bonding, ionic bonding, hydrogen bonding, and the like. In some embodiments the high heat thermoplastic resin has end groups that are capable of reacting with or are compatible with the urethane groups, aminosilane or a combination thereof. Exemplary end groups include anhydride, hydroxy, and amine. Exemplary high heat thermoplastic resins include polyimide, polyetherimide, polyphenylsulfone, polysulfone, polyether sulfone, and combinations comprising one or more of the foregoing. The high heat resin may optionally be blended with a second resin that is not a high heat resin such as a polycarbonate, polycarbonate ester, polyester, polyamide, or a combination comprising one or more of the foregoing as long as the combination of the high heat resin and the second resin have a glass transition temperature greater than or equal to 80° C., or, more specifically, greater than or equal to 100° C., and do not suffer from delamination.

The second resin, when present, may be used in an amount of 5 to 80 weight percent (wt %), or, more specifically, 10 to 40 wt %, or, even more specifically, 10 to 30 wt %, based on the total weight of the composition.

Polyimides have the general formula (1)

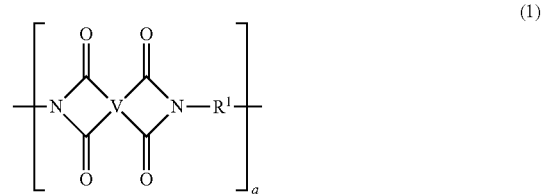

wherein a is greater than 1, typically 10 to 1000 or more, or, more specifically 10 to 500; and wherein V is a tetravalent linker without limitation, as long as the linker does not impede synthesis or use of the polyimide. Suitable linkers include but are not limited to: (a) substituted or unsubstituted, saturated, unsaturated or aromatic monocyclic and polycyclic groups having 5 to 50 carbon atoms, (b) substituted or unsubstituted, linear or branched, saturated or unsaturated alkyl groups having 1 to 30 carbon atoms; or combinations thereof. Exemplary linkers include but are not limited to tetravalent aromatic radicals of formula (2), such as

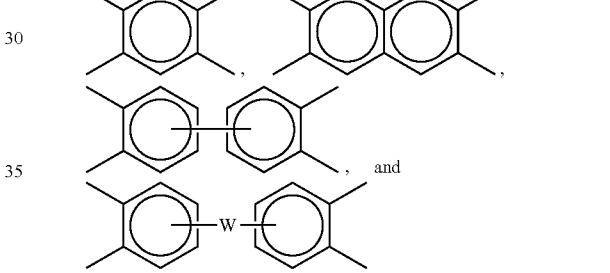

wherein W is a divalent group selected from the group consisting of —O—, —S—, —C(O)—, $SO_2$—, —SO—, —$C_yH_{2y}$— (y being an integer having a value of 1 to 8), and fluorinated derivatives thereof, including perfluoroalkylene groups, or a group of the formula —O—Z—O— wherein the divalent bonds of the —W— or the —O—Z—O— group are in the 3,3', 3,4', 4,3', or the 4,4' positions, and wherein Z includes, but is not limited to, substituted or unsubstituted divalent organic radicals such as: (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula 3

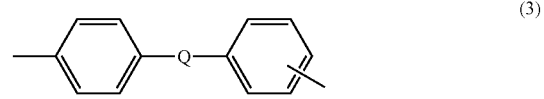

wherein Q includes but is not limited to a divalent moiety selected from the group consisting of —O—, —S—, —C(O)—, —$SO_2$—, —SO—, —$C_yH_{2y}$— (y being an integer from 1 to 8), and fluorinated derivatives thereof, including perfluoroalkylene groups. Z may comprise exemplary divalent radicals of formula (4)

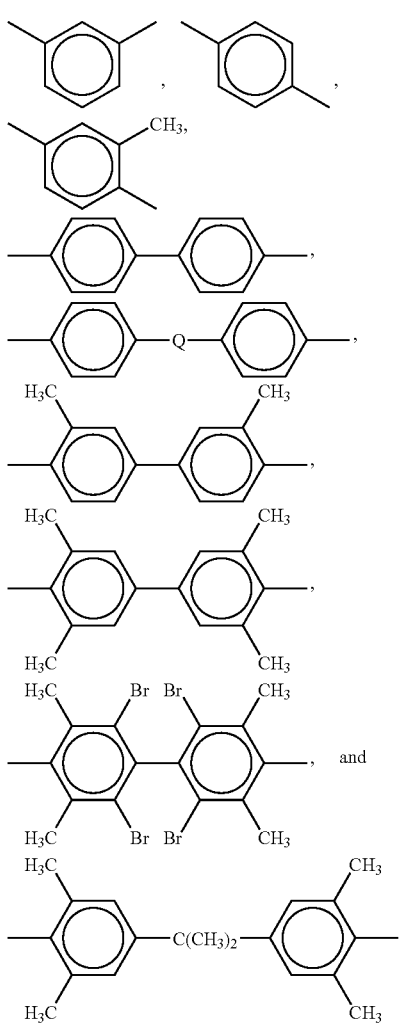

$R^1$ in formula (1) includes but is not limited to substituted or unsubstituted divalent organic radicals such as: (a) aromatic hydrocarbon radicals having 6 to 24 carbon atoms and halogenated derivatives thereof; (b) straight or branched chain alkylene radicals having 2 to 20 carbon atoms; (c) cycloalkylene radicals having 3 to 24 carbon atoms, or (d) divalent radicals of formula (3) defined as above.

Some classes of polyimides include polyamidimides, polyetherimide sulfones and polyetherimides, particularly those polyetherimides known in the art which are melt processable, such as those whose preparation and properties are described in U.S. Pat. Nos. 3,803,085 and 3,905,942.

Polyetherimide resins may comprise more than 1, typically 10 to 1000 or more, or, more specifically, 10 to 500 structural units, of the formula (5)

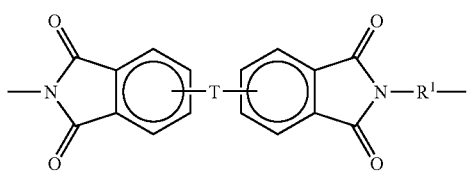

wherein $R^1$ is defined as above, T is —O— or a group of the formula —O—Z—O— wherein the divalent bonds of the —O— or the —O—Z—O— group are in the 3,3', 3,4', 4,3', or the 4,4' positions, and wherein Z is defined above. In one embodiment, the polyimide, polyetherimide or polyetherimide sulfone may be a copolymer. Mixtures of the polyimide, polyetherimide or polyetherimide sulfone may also be employed.

The polyetherimide can be prepared by any of the methods well known to those skilled in the art, including the reaction of an aromatic bis(ether anhydride) of the formula (6)

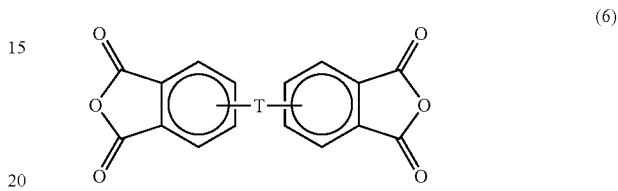

with an organic diamine of the formula (7)

$$H_2N—R^1—NH_2 \quad (7)$$

wherein T and $R^1$ are defined as described above.

Examples of specific aromatic bis anhydrides and organic diamines are disclosed, for example, in U.S. Pat. Nos. 3,972,902 and 4,455,410. Illustrative examples of aromatic bis anhydrides include:
3,3-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
4,4'-bis(3,4-dicarboxyphenoxy)benzophenone dianhydride;
4,4'-bis(3,4-dicarboxyphenoxy)diphenyl sulfone dianhydride;
2,2-bis[4-(2,3-dicarboxyphenoxy)phenyl]propane dianhydride;
4,4'-bis(2,3-dicarboxyphenoxy)diphenyl ether dianhydride;
4,4'-bis(2,3-dicarboxyphenoxy)diphenyl sulfide dianhydride;
4,4'-bis(2,3-dicarboxyphenoxy)benzophenone dianhydride;
4,4'-bis(2,3-dicarboxyphenoxy)diphenyl sulfone dianhydride;
4-(2,3-dicarboxyphenoxy)-4'-(3,4-dicarboxyphenoxy) diphenyl-2,2-propane dianhydride;
4-(2,3-dicarboxyphenoxy)-4'-(3,4-dicarboxyphenoxy) diphenyl ether dianhydride;
4-(2,3-dicarboxyphenoxy)-4'-(3,4-dicarboxyphenoxy) diphenyl sulfide dianhydride;
4-(2,3-dicarboxyphenoxy)-4'-(3,4-dicarboxyphenoxy)benzophenone dianhydride; and,
4-(2,3-dicarboxyphenoxy)-4'-(3,4-dicarboxyphenoxy) diphenyl sulfone dianhydride, as well as various mixtures thereof.

Another class of aromatic bis(ether anhydride)s included by formula (6) above includes, but is not limited to, compounds wherein T is of the formula (8)

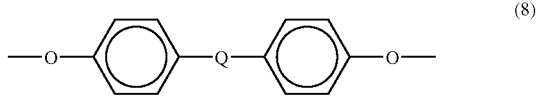

and the ether linkages, while shown in the 4,4' positions may also be in the 3,3', 3,4', or 4,3' positions and where Q is as defined above.

Examples of suitable compounds include ethylenediamine, propylenediamine, trimethylenediamine, diethylenetriamine, triethylenetertramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis (p-amino-t-butyl)toluene, bis(p-amino-t-butylphenyl)ether, bis(p-methyl-o-aminophenyl)benzene, bis(p-methyl-o-aminopentyl)benzene, 1,3-diamino-4-isopropylbenzene, bis(4-aminophenyl)sulfide, bis(4-aminophenyl)sulfone, and bis(4-aminophenyl)ether. Mixtures of these compounds may also be used. The preferred diamino compounds are aromatic diamines, especially m- and p-phenylenediamine, sulfonyl dianiline and mixtures thereof.

In one embodiment, the polyetherimide resin comprises structural units according to formula (5) wherein each R is independently p-phenylene or m-phenylene or a mixture thereof and T is a divalent radical of the formula (9)

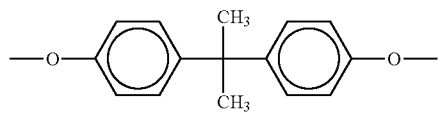

(9)

Included among the many methods of making the polyimides, particularly polyetherimides, are those disclosed in U.S. Pat. Nos. 3,847,867, 3,852,242, 3,803,085, 3905,942, 3,983,093, and 4,443,591. These patents mentioned for the purpose of teaching, by way of illustration, general and specific methods for preparing polyimides.

Polyimides, polyetherimides and polyetherimide sulfones may have a melt index of 0.1 to 10 grams per minute (g/min), as measured by American Society for Testing Materials (ASTM) D1238 at 340 to 370° C., using a 6.6 kilogram (kg) weight. In a one embodiment, the polyetherimide resin has a weight average molecular weight (Mw) of 10,000 to 150,000 grams per mole (g/mole), as measured by gel penetration chromatography, using polystyrene standards. In another embodiment the polyetherimide has Mw of 20,000 to 60,000. Such polyetherimide resins typically have an intrinsic viscosity greater than 0.2 deciliters per gram (dl/g), or, more specifically, 0.35 to 0.7 dl/g as measured in m-cresol at 25° C.

In embodiments where the high heat thermoplastic resin consists of a polyetherimide the composition has a double gated tensile strength greater than or equal to 75 MegaPascals as determined according to ASTM D638.

In embodiments where the high heat thermoplastic resin comprises polyetherimide and polycarbonate ester the composition has a double gated tensile strength greater than or equal to 40 MegaPascals as determined according to ASTM D638.

Polysulfones, poly(ether sulfone)s and poly(phenylene ether sulfone)s are thermoplastic polymers that have high temperature resistance and good hydrolytic stability. Polysulfones, poly(ether sulfone)s and poly(phenylene ether sulfone)s are described, for example, in U.S. Pat. Nos. 3,634,355, 4,008,203, 4,108,837 and 4,175,175.

Polysulfones comprise repeating units having the structure of formula 10:

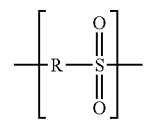

(10)

wherein R is an aromatic group comprising carbon-carbon single bonds, carbon-oxygen-carbon bonds or carbon-carbon and carbon-oxygen-carbon single bonds and the single bonds form a portion of the polymer backbone.

Poly(ether sulfone)s comprise repeating units having both an ether linkage and a sulfone linkage in the backbone of the polymer as shown in formula 11:

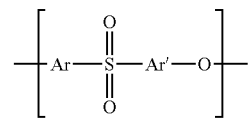

(11)

wherein Ar and Ar' are aromatic groups which may be the same or different. Ar and Ar' may be the same or different. When Ar and Ar' are both phenylene the polymer is known as poly(phenylene ether sulfone). The number of sulfone linkages and the number of ether linkages may be the same or different. An exemplary structure demonstrating when the number of sulfone linkages differ from the number of ether linkages is shown in formula (12):

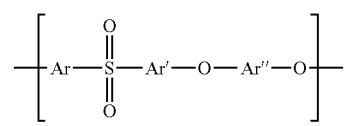

(12)

wherein Ar, Ar' and Ar'' are aromatic groups which may be the same or different. Ar, Ar' and Ar'' may be the same or different, for instance, Ar and Ar' may both be phenylene and Ar'' may be a bis(1,4-phenylene)isopropyl group.

A variety of polysulfones and poly(ether sulfone)s are commercially available, including the polycondensation product of dihydroxy diphenyl sulfone with dichloro diphenyl sulfone, and the polycondensation product of bisphenol-A and or biphenol with dichloro diphenyl sulfone. Examples of commercially available resins include RADEL R, RADEL A, and UDEL, available from Solvay, Inc., and ULTRASON E, available from BASF Co.

Methods for the preparation of polysulfones and poly(ether sulfones) are widely known and several suitable processes have been well described in the art. Two methods, the carbonate method and the alkali metal hydroxide method, are known to the skilled artisan. In the alkali metal hydroxide method, a double alkali metal salt of a dihydric phenol is contacted with a dihalobenzenoid compound in the presence of a dipolar, aprotic solvent under substantially anhydrous conditions. The carbonate method, in which a dihydric phenol and a dihalobenzenold compound are heated, for example, with sodium carbonate or bicarbonate and a second alkali metal carbonate or bicarbonate is also disclosed in the art, for example in U.S. Pat. No. 4,176,222. Alternatively, the polysulfone and poly (ether sulfone) may be prepared by any of the variety of methods known in the art.

The molecular weight of the polysulfone or poly(ether sulfone), as indicated by reduced viscosity data in an appropriate solvent such as methylene chloride, chloroform, N-methylpyrrolidone, or the like, can be greater than or equal to 0.3 dl/g, or, more specifically, greater than or equal to 0.4 dl/g and, typically, will not exceed 1.5 dl/g.

In some instances the polysulfone or poly(ether sulfone) weight average molecular weight can be 10,000 to 100,000 grams per mole (g/mol) as determined by gel permeation chromatography using ASTM D5296. Polysulfones and poly (ether sulfone)s may have glass transition temperatures of 180° C. to 250° C. in some instances. Polysulfone resins are further described in ASTM D6394 Standard Specification for Sulfone Plastics.

In embodiments where the high heat thermoplastic resin comprises polysulfone the composition has a double gated tensile strength greater than or equal to 50 MegaPascals as determined according to ASTM D638.

Useful glass fibers can be formed from any type of glass composition known to be useful in high temperature thermoplastics, and include, but are not limited to, those prepared from fiberizable glass compositions commonly known as "E-glass," "A-glass," "C-glass," "D-glass," "R-glass," "S-glass," as well as E-glass derivatives that are fluorine-free and/or boron-free. Glass fibers are sometimes referred to as fiberglass. Commercially produced glass fibers generally have average diameters of 4.0 to 35.0 micrometers, and most commonly produced E-glass fibers have an average diameter of 9.0 to 30.0 micrometers. The glass fiber has an average length of 1.0 to 20 millimeters, or, more specifically, 2 to 10 millimeters. Glass fibers have a length to diameter ratio (aspect ratio) of greater than one, or, more specifically greater than or equal to 50, or, even more specifically, greater than or equal to 100. The glass fiber may be made by standard processes, e.g., by steam or air blowing, flame blowing and mechanical pulling. Generally, filaments for plastics reinforcement are made by mechanical pulling. Use of non round fiber cross section is also possible.

The glass fibers can be treated with a coating. In preparing the glass fibers, a number of filaments can be formed simultaneously, treated with the coating and then bundled into what is called a strand. Alternatively the strand itself may be first formed of filaments and then treated with a coating. The amount of glass fiber in the composition is 15 to 35 wt %, or, more specifically, 17 to 33 wt %, or, even more specifically, 19 to 31 wt %, based on the total weight of the thermoplastic composition.

The coating comprises a coupling agent, a binder or a combination thereof. Exemplary coupling agents include titanate and silane coupling agents. Silane coupling agents include epoxysilane compound, aminosilane compounds methacryloxysilane compounds, vinylsilane compounds and combinations of two or more of the foregoing. Exemplary binders include maleic anhydride copolymers, acrylic acid copolymers, a polymer comprising urethane groups, other binders known in the art and combinations of binders. In some embodiments the glass fiber has a coating comprising urethane groups and an aminosilane.

Illustrative examples of aminosilane coupling agents include gamma-aminopropyltrimethoxysilane, gamma-aminopropyltriethoxysilane, N-beta(aminoethyl)gamma-aminopropylmethyldimethoxysilane, N-beta(aminoethyl)gamma-aminopropyltrimethoxysilane, N-beta(aminoethyl)γ-aminopropyltriethoxysilane and combinations of two or more of the foregoing. Illustrative epoxysilane coupling agents include gamma-glycidoxypropylmethyldiethoxysilane, gamma-glycidoxypropyltrimethoxysilane, gamma-glycidoxypropyltriethoxysilane and combinations of two or more of the foregoing. Illustrative methacryloxysilane coupling agents include gamma-methacryloxypropylmethyldimethoxysilane, gamma-methacryloxypropyltrimethoxysilane, gamma-methacryloxypropyldiethoxysilane, gamma-methacryloxypropyltriethoxysilane, and combinations of two or more of the foregoing. Illustrative vinylsilane coupling agents include vinyltrimethoxysilane, vinyltriethoxysilane, vinyltris(beta-methoxyethoxy)silane and combinations of two or more of the foregoing.

The composition further comprises a particulate glass filler. Particulate glass filler, as used herein, described fillers having an aspect ratio (length/width in the case of flake type fillers or length/diameter in the case of spherical type fillers) less than or equal to 1. Exemplary particulate glass fillers include glass beads, glass flake, and combinations thereof. The particulate glass filler comprises glass as described above with regard to the glass fiber. The particulate glass filler has a coating comprising urethane groups and an aminosilane. The particulate glass filler has an average particle size of 20 to 160 micrometers.

The particulate glass filler may be present in an amount of 15 to 35 wt %, or, more specifically, 17 to 33 wt %, or, even more specifically, 19 to 31 wt %, based on the total weight of the composition.

The composition may optionally comprise additives such as UV absorbers; stabilizers such as light stabilizers and others; lubricants; plasticizers; pigments; dyes; colorants; anti-static agents; foaming agents; blowing agents; metal deactivators, and combinations comprising one or more of the foregoing additives. Antioxidants can be compounds such as phosphites, phosphonites and hindered phenols or mixtures thereof. Phosphorus containing stabilizers including triaryl phosphite and aryl phosphonates are of note as useful additives. Difunctional phosphorus containing compounds can also be employed. Stabilizers may have a molecular weight greater than or equal to 300. In some embodiments, phosphorus containing stabilizers with a molecular weight greater than or equal to 500 are useful. Phosphorus containing stabilizers are typically present in the composition at 0.05-0.5% by weight of the formulation. Flow aids and mold release compounds are also contemplated.

In another embodiment, a composition can further include a mold-release agent. Examples of the mold-release agents include, but are not limited to natural and synthetic paraffins, polyethylene waxes, fluorocarbons, and other hydrocarbon mold-release agents; stearic acid, hydroxystearic acid, and other higher fatty acids, hydroxyfatty acids, and other fatty acid mold-release agents; stearic acid amide, ethylenebisstearamide, and other fatty acid amides, alkylenebisfatty acid amides, and other fatty acid amide mold-release agents; stearyl alcohol, cetyl alcohol, and other aliphatic alcohols, polyhydric alcohols, polyglycols, polyglycerols and other alcoholic mold release agents; butyl stearate, pentaerythritol tetrastearate, and other lower alcohol esters of fatty acid, polyhydric alcohol esters of fatty acid, polyglycol esters of fatty acid, and other fatty acid ester mold release agents; silicone oil and other silicone mold release agents, and mixtures of any of the aforementioned. The mold release agent can be used in conjunction with other additives, e.g., teflon styrene acrylonitrile.

The amount of the mold release agent can be greater than or equal to 0.1 wt. %, based on the total weight of the composition. In one embodiment, the amount of the mold release agent is 0.1 to 2 wt. %, based on the total weight of the composition. In another embodiment, the amount of the mold release agent is 0.5 to 1 wt. %, based on the total weight of the composition.

Advantageously, the composition can contain combinations other than those expressly listed above. For example, in one embodiment a thermoplastic composition comprises: 30 wt % to 70 wt % of a polyetherimide having anhydride end groups and a weight average molecular weight of 28,000 to 38,000 as determined by light scattering; 15 wt % to 40 wt % of a polycarbonate ester, 15 wt % to 35 wt % of a glass fiber; 15 wt % to 35 wt % of a particulate glass filler; and an additive selected from the group consisting of UV absorbers; stabilizers; lubricants; plasticizers; pigments; dyes; colorants; antistatic agents; foaming agents; blowing agents; metal deactivators, and combinations thereof; such that the particulate glass filler, prior to forming the composition, has a coating comprising an aminosilane and a urethane groups. The additive can include any of the additives mentioned above in the respective amounts. The additive can be pentaerythritol tetrastearate. Alternatively, the additive can be a phosphite stabilizer. In one embodiment, the additive can include mixtures of pentaerythritol tetrastearate and a stabilizer selected from the group consisting of phosphite stabilizers, hindered phenol stabilizers, and combinations thereof. Amounts are based on the total weight of the composition. The particulate glass filler can be a glass flake and the glass fiber can be a glass fiber with the aspect ratio greater than 100. Other modifications are possible.

The thermoplastic composition can be prepared melt mixing or a combination of dry blending and melt mixing. Melt mixing can be performed in single or twin screw type extruders or similar mixing devices which can apply a shear and heat to the components. Melt mixing can be performed at temperatures greater than or equal to the melting temperatures of the high heat thermoplastic resin and less than the degradation temperatures of any of the components of the composition.

All of the ingredients may be added initially to the processing system. In some embodiments, the ingredients may be added sequentially or through the use of one or more master batches. It can be advantageous to add the glass fiber downstream to reduce the amount of fiber breakage.

In one embodiment the composition comprises a reaction product of melt mixing the high heat thermoplastic resin and the particulate glass filler having a coating comprising urethane groups and an aminosilane.

In some embodiments melt mixing is performed using an extruder and the composition exits the extruder in a strand or multiple strands. The shape of the strand is dependent upon the shape of the die used and has no particular limitation.

In one embodiment, a method of making a thermoplastic composition comprises: melt blending a high heat thermoplastic resin and particulate glass filler to form a first mixture; and melt blending the first mixture with a glass fiber. The particulate glass filler has a coating comprising urethane groups and an aminosilane.

One embodiment is an article comprising a thermoplastic composition wherein the thermoplastic composition comprises: high heat thermoplastic resin, glass fiber, and a particulate glass filler. The particulate glass filler, prior to forming the composition, has a coating comprising urethane groups and an aminosilane.

The compositions are further described by the following non-limiting examples.

EXAMPLES

Examples 1-14

The following examples used the materials shown in Table 1. Unless otherwise specified the amounts shown in the following tables are in weight percent based on the total weight of the composition.

TABLE 1

| Component | Description |
| --- | --- |
| PEI | Polyetherimide having anhydride end groups and a weight average molecular weight of 32,000 as determined by light scattering. This polyetherimide is commercially available from GE Plastics under the tradename ULTEM ™ 1010. |
| PES | Polyether sulfone having viscosity number of 56 ml/g as determined by ISO 307. This polyether sulfone is commercially available from BASE under the tradename ULTRASON ™ E2010. |
| PCE | Polycarbonate ester having p-cumylphenol end groups and a weight average molecular weight of 28,350 as determined by light scattering. This polycarbonate ester is commercially available from GE Plastics under the tradename LEXAN ™. |
| Glass fiber | Glass fiber having an average diameter of 10 micrometer and an average length of 4 millimeters. The glass fiber is coated with a silane coupling agent and a binding agent. The glass fiber is commercially available from Owens Corning under the tradename OC 165A-10P. |
| Mica I | Mica having an average particle size of 15 micrometers and a length to thickness ratio of 5. This mica is commercially available from Suzorite under the tradename 400HK. |
| Mica II | Mica having an average particle size of 189 micrometers and a length to thickness ratio of 16. This mica is commercially available from Suzorite under the tradename 150S. |
| Glass flake I | Glass flake having an average particle size of 140 micrometers and a length to thickness ratio of 28. The glass flake is coated with an epoxy silane/amino silane coupling agent and an epoxy binding agent. The glass flake is commercially available from Nippon Sheet Glass under the tradename REFG301. |
| Glass flake II | Glass flake having an average particle size of 140 micrometers and a length to thickness ratio of 28. The glass flake is coated with an aminosilane coupling agent and a urethane binding agent. The glass flake is commercially available from Nippon Sheet Glass under the tradename REFG302. |

TABLE 1-continued

| Component | Description |
|---|---|
| Glass flake III | An uncoated glass flake having an average particle size of 40 micrometers and a length to thickness ratio of 8. The glass flake is commercially available from Nippon Sheet Glass under the tradename REF140. |
| Epoxysilane | Epoxysilane having a weight average molecular weight of 236 and commercially available from GE Advanced Materials under the tradename A-187. |
| Aminosilane | Aminosilane having a weight average molecular weight of 221 and commercially available from GE Advanced Materials under the tradename A-1100. |
| Clay | A clay having an average particle size of 42 micrometers commercially available from J. M. Huber Corp. under the tradename Polyfil HG-90. |

The compositions were tested for tensile strength according to ASTM D1638 at 5.0 millimeters per minute using both single gate and double gate samples. The single gate (SG) samples the molten composition was injected into the mold from a single location at one end of the sample. In double gate (DG) samples the molten composition was injected into the mold from two locations, each located at an opposite end of the sample and causing the formation of a weld line. Tensile strength testing on double gated samples evaluates the weld line strength. Tensile strength values are in MegaPascals (MPa). The compositions were also tested for flexural strength at yield according to ASTM D 790 using 3.2 millimeter thick bars at a speed of 2.7 millimeters per minute. The span was 50 millimeters. Flexural strength results are reported in MPa. The compositions were further tested for heat distortion temperature (HDT) according to ASTM D648 at 1.82 MPa using 3.2 millimeter thick bars and results are reported in ° C. Notched Izod testing was performed according to ASTM D256 and results are reported in Joules/meter (J/m).

TABLE 2

| Components | 1* | 2* | 3* | 4* | 5* | 6* | 7* | 8* | 9* |
|---|---|---|---|---|---|---|---|---|---|
| PEI | 55 | 55 | 55 | 55 | 55 | 55 | 55 | 55 | 55 |
| Glass fiber | 20 | 20 | 20 | 20 | 20 | 20 | 20 | 20 | 20 |
| Mica II | 25 | 24.5 | 24.5 | — | — | — | — | — | — |
| Clay | — | — | — | 25 | 24.5 | 24.5 | — | — | — |
| Glas flake I | — | — | — | — | — | — | — | — | 25 |
| Glass flake II | — | — | — | — | — | — | — | 25 | — |
| Glass flake III | — | — | — | — | — | — | 25 | — | — |
| Epoxysilane | — | 0.5 | — | — | 0.5 | — | — | — | — |
| Aminosilane III | — | — | 0.5 | — | — | 0.5 | — | — | — |
| Tensile Strength (SG), MPa | 117 | 136 | 137 | 90 | 94 | 95 | 115 | 132 | 117 |
| Tensile Strength (DG), MPa | 31 | 42 | 44 | 40 | 51 | 50 | 41 | 77 | 63 |
| TS (DG)/TS (SG) | 0.27 | 0.30 | 0.32 | 0.44 | 0.54 | 0.53 | 0.35 | 0.58 | 0.53 |
| Flex strength at yield, MPa | 185 | 187 | 196 | 155 | 143 | — | 172 | 175 | 143 |
| HDT, 1.82 MPa, ° C. | 206 | 209 | 207 | 203 | 206 | — | 207 | 205 | 206 |
| Izod, notched, J/m | 42 | 42 | 41 | 19 | 19 | — | 33 | 35 | 38 |

*Comparative example

Examples 1-9

Examples 2 and 3 use mica that was coated with the silane indicated in Table 2. Examples 5 and 6 use clay that was coated with the silane indicated in Table 2. The mica and clay were coated by mixing with stirring at high speed in a Superfloater. The glass flake used in Examples 8 and 9 was coated by the glass manufacturer.

The thermoplastic resin and particulate filler, e.g., glass flake, clay, or mica, were dry blended and melt mixed using a 37 millimeter Toshiba twin screw extruder at 330-345° C. barrel set temperature and 300-350 rotations per minute. The glass fiber was added downstream using a side feeder. The mixture was extruded as strands and cut into pellets after cooling in a water bath. The pellets were dried in an oven at 150° C. for 4 to 6 hours before being injection molded for testing. Compositions and data are shown in Table 2. Examples 5-8 contained 0.5 weight percent of thermal stabilizers and release agents.

Example 8 is an example in which the glass filler has a coating comprising urethan groups and an aminosilane before forming the composition. The results show that the composition of Example 8 shows a substantially higher double gated tensile strength, as compared to the other compositions in the comparative examples that are made with glass fillers that do not have coatings with urethane groups and an aminosilane. For instance, the composition of Example 8 shows that it has more than twice the double gate tensile strength of Example 1, which is based on a composition containing polyetherimide, glass fibers and mica.

Example 8 also shows the double the ratio of DG tensile strength to SG tensile strength compared with Example 1. That is to say, the invention is the most effective composition to boost the weldline strength. Among the different types of non-fiber fillers, compositions with coatings comprising silane had higher double gated tensile strength than the corresponding one without coating. Again, Example 8 with a glass filler having a coating comprising urethane groups and an amino silane coated showed the highest double gated tensile strength among all the composition with the non-fiber fillers coated with silane.

Examples 8 and 9, which use a coated glass flake, show a startling increase in both single gated and double gated tensile strengths when compared to Example 7 which uses uncoated glass flake. Even more surprising is the fact that Example 8, which employs glass flake with an aminosilane coupling agent and a urethane binding agent, demonstrates a double gated tensile strength which is markedly higher than that of Example 9 which uses an aminosilane coupling agent and an epoxy binding agent.

Examples 10-14

Examples 10-14 were made and tested as described above for Examples 1-9. Examples 10-12 contained 0.5 weight percent thermal stabilizers and release agents. Compositions and results are shown in Table 3.

TABLE 3

| Components | 10* | 11 | 12* | 13* | 14 |
|---|---|---|---|---|---|
| PEI | 29.5 | 29.5 | 29.5 | | |
| PES | | | | 55 | 55 |
| PCE | 20 | 20 | 20 | | |
| Glass fiber | 30 | 30 | 30 | 20 | 20 |
| Glass flake I | | | 20 | | |
| Glass flake II | | 20 | | | 25 |
| Glass flake III | 20 | | | 25 | |
| Tensile Strength (SG), MPa | 134 | 133 | 141 | 100 | 108 |
| Tensile Strength (DG), MPa | 37 | 50 | 42 | 38 | 65 |
| TS (DG)/TS (SG) | 0.27 | 0.38 | 0.30 | 0.38 | 0.60 |
| Flex strength at yield, MPa | 176 | 177 | 176 | 149 | 162 |
| HDT, 1.82 MPa, °C. | 184 | 185 | 186 | 204 | 206 |
| Izod, notched, J/m | 47 | 57 | 38 | 41 | 43 |

*Comparative example

Examples 10 through 14 demonstrate results similar to the results of Examples 7-9 but with different resin systems. Example 10 contains an uncoated glass flake and Example 12 contains a glass flake coated with an aminosilane coupling agent and an epoxy binding agent. Both Examples 10 and 12 have a lower single gated and double gated tensile strength than Example 11 which contains a glass flake coated with an aminosilane coupling agent and a urethane binding agent. A comparison of Examples 13 and 14 shows that there is a marked increase in double gated tensile strength when a glass flake coated with a urethane binder and aminosilane coupling agent is used in a polyether sulfone matrix. The increase compared to the sample using uncoated glass flake is even higher than when the matrix resin comprises polyetherimide or polyetherimide and polycarbonate ester.

As can be seen from the foregoing examples, a marked and surprising increase in double gated tensile strength can be achieved by using glass flake coated with aminosilane coupling agent and a urethane binding agent.

While the invention has been described with reference to a several embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A thermoplastic composition comprising:
   high heat thermoplastic resin;
   15 to 35 weight percent of a glass fiber; and
   15 to 35 weight percent of a particulate glass filler,
   wherein all amounts are based on the total weight of the composition,
   wherein the glass fiber, prior to forming the composition, has a coating comprising a coupling agent and a binder,
   wherein the particulate glass filler, prior to forming the composition, has a coating comprising urethane groups and an aminosilane and
   wherein the high heat thermoplastic resin is selected from the group consisting of polyetherimide, polyether sulfone and combinations thereof.

2. The thermoplastic composition of claim 1, wherein the high heat thermoplastic resin consists of polyetherimide and the composition has a double gated tensile strength greater than or equal to 75 MegaPascals as determined according to ASTM D638.

3. The thermoplastic composition of claim 1, wherein the high heat thermoplastic resin consists ofpolyetherimide and the thermoplastic composition further comprises a polycarbonate ester and the composition has a double gated tensile strength greater than or equal to 40 MegaPascals as determined according to ASTM D638.

4. The thermoplastic composition of claim 1, wherein the high heat thermoplastic resin consists of polyethersulfone and the composition has a double gated tensile strength greater than or equal to 50 MegaPascals as determined according to ASTM D638.

5. The composition of claim 1, wherein the glass fiber is present in an amount of 19 to 31 weight percent, and the particulate glass filler is present in an amount of 19 to 31 weight percent, wherein all amounts are based on the total weight of the composition.

6. The composition of claim 1, wherein the high heat thermoplastic resin has a glass transition temperature greater than or equal to 180° C.

7. The composition of claim 1, wherein the glass fiber has an average length of 1 to 20 millimeters.

8. The composition of claim 1, wherein the particulate glass filler has an average particle size of 20 to 160 micrometers.

9. The composition of claim 1, wherein the glass fiber, prior to forming the composition, has a coating comprising urethane groups and an aminosilane.

10. The composition of claim 1, wherein the composition further comprises a second resin wherein the second resin is not a high heat resin.

11. The composition of claim 10, wherein the second resin is selected from the group consisting of polycarbonate, polycarbonate ester, polyester, polyamide, and combinations of two or more of the foregoing.

12. A thermoplastic composition comprising:
   a high heat thermoplastic resin;
   15 to 35 weight percent of a glass fiber; and
   15 to 35 weight percent of a particulate glass filler,
   wherein all amounts are based on the total weight of the composition, wherein the glass fiber, prior to forming the composition, has a coating comprising a coupling agent and a binder,
   wherein the particulate glass filler, prior to forming the composition, has a coating comprising urethane groups and an aminosilane, and
   wherein the high heat thermoplastic resin, prior to forming the composition, has end groups reactive with or compatible with the urethane groups, aminosilane, or a combination thereof under melt mixing conditions and wherein the high heat thermoplastic resin is selected from the group consisting of polyetherimide, polyether sulfone and combinations thereof.

13. The thermoplastic composition of claim 12, wherein the high heat thermoplastic resin consists of polyetherimide and the composition has a double gated tensile strength greater than or equal to 75 MegaPascals as determined according to ASTM D638.

14. The thermoplastic composition of claim 12, wherein the high heat thermoplastic resin consists of polyetherimide and the composition further comprises a polycarbonate ester and the composition has a double gated tensile strength greater than or equal to 40 MegaPascals as determined according to ASTM D638.

15. The thermoplastic composition of claim 12, wherein the high heat thermoplastic resin consists of polyethersulfone and the composition has a double gated tensile strength greater than or equal to 50 MegaPascals as determined according to ASTM D638.

16. The composition of claim 12, wherein the glass fiber is present in an amount of 19 to 31 weight percent, and the particulate glass filler is present in an amount of 19 to 31 weight percent, wherein all amounts are based on the total weight of the composition.

17. The composition of claim 12, wherein the high heat thermoplastic resin has a glass transition temperature greater than or equal to 180° C.

18. The composition of claim 12, wherein the glass fiber has an average length of 1 to 20 millimeters.

19. The composition of claim 12, wherein the particulate glass filler has an average particle size of 20 to 160 micrometers.

20. The composition of claim 12, wherein the glass fiber, prior to forming the composition, has a coating comprising urethane groups and an aminosilane.

21. The composition of claim 12, wherein the composition further comprises a second resin wherein the second resin is not a high heat resin.

22. The composition of claim 21, wherein the second resin is selected from the group consisting of polycarbonate, polycarbonate ester, polyester, polyamide, and combinations of two or more of the foregoing.

23. A thermoplastic composition comprising:
a high heat thermoplastic resin;
15 to 35 weight percent of a glass fiber; and
15 to 35 weight percent of a particulate glass filler,
wherein all amounts are based on the total weight of the composition,
wherein the glass fiber, prior to forming the composition, has a coating comprising a coupling agent and a binder,
wherein the particulate glass filler, prior to forming the composition, has a coating comprising urethane groups and an aminosilane,
wherein the high heat thermoplastic resin, prior to forming the composition, has anhydride end groups, amino end groups, or a combination thereof, and
and wherein the high heat thermoplastic resin is selected from the group consisting of polyetherimide, polyether sulfone and combinations thereof.

24. The thermoplastic composition of claim 23, wherein the high heat thermoplastic resin consists of polyetherimide and the composition has a double gated tensile strength greater than or equal to 75 MegaPascals as determined according to ASTM D638.

25. The thermoplastic composition of claim 23, wherein the high heat thermoplastic resin consists of polyetherimide and the composition further comprises a polycarbonate ester and the composition has a double gated tensile strength greater than or equal to 40 MegaPascals as determined according to ASTM D638.

26. The thermoplastic composition of claim 23, wherein the high heat thermoplastic resin consists of polyethersulfone and the composition has a double gated tensile strength greater than or equal to 50 MegaPascals as determined according to ASTM D638.

27. The composition of claim 23, wherein the glass fiber is present in an amount of 19 to 31 weight percent, and the particulate glass filler is present in an amount of 19 to 31 weight percent, wherein all amounts are based on the total weight of the composition.

28. The composition of claim 23, wherein the high heat thermoplastic resin has a glass transition temperature greater than or equal to 180° C.

29. The composition of claim 23, wherein the glass fiber has an average length of 1 to 20 millimeters.

30. The composition of claim 23, wherein the particulate glass filler has an average particle size of 20 to 160 micrometers.

31. The composition of claim 23, wherein the glass fiber, prior to forming the composition, has a coating comprising urethane groups and an aminosilane.

32. The composition of claim 23, wherein the composition further comprises a second resin wherein the second resin is not a high heat resin.

33. The composition of claim 32, wherein the second resin is selected from the group consisting of polycarbonate, polycarbonate ester, polyester, polyamide, and combinations of two or more of the foregoing.

34. A method of making a thermoplastic composition comprising:
melt blending a high heat thermoplastic resin and particulate glass filler to form a first mixture;
melt blending the first mixture with a glass fiber,
wherein the glass fiber has a coating comprising a coupling agent and a binder,
wherein the particulate glass filler has a coating comprising urethane groups and an aminosilane and
wherein the high heat thermoplastic resin is selected from the group consisting of polyetherimide, polyether sulfone and combinations thereof.

35. The method of claim 34, wherein the glass fiber, prior to forming the composition, has a coating comprising urethane groups and an aminosilane.

36. The method of claim 34, wherein the high heat thermoplastic resin, prior to forming the composition, has end groups capable of reacting with or compatible with the urethane groups, aminosilane or combination thereof.

37. An article comprising a thermoplastic composition wherein the thermoplastic composition comprises:
high heat thermoplastic resin;
15 to 35 weight percent of a glass fiber; and
15 to 35 weight percent of a particulate glass filler,
wherein all amounts are based on the total weight of the composition,
wherein the glass fiber, prior to forming the composition, has a coating comprising a coupling agent and a binder,
wherein the particulate glass filler, prior to forming the composition, has a coating comprising urethane groups and an aminosilane and wherein the high heat thermoplastic resin is selected from the group consisting of polyetherimide, polyether sulfone and combinations thereof.

38. A thermoplastic composition comprising:
- 30 weight percent to 70 weight percent of a polyetherimide having anhydride end groups and a weight average molecular weight of 28,000 to 38,000 as determined by light scattering;
- 15 weight percent to 40 weight percent of a polycarbonate ester
- 15 weight percent to 35 weight percent of glass fiber;
- 15 weight percent to 35 weight percent of a particulate glass filler;
- an additive selected from the group consisting of UV absorbers; stabilizers; lubricants; plasticizers; pigments; dyes; colorants; anti-static agents; foaming agents; blowing agents; metal deactivators, and combinations thereof;
- wherein the glass fiber, prior to forming the composition, has a coating comprising a couplingagent and a binder,
- wherein the particulate glass filler, prior to forming the composition, has a coating comprising urethane groups and an aminosilane, and
- wherein the weight percents are based on the total weight of the composition.

39. The composition of claim 38, wherein the additive is pentaerythritol tetrastearate.

40. The composition of claim 38, wherein the additive is a phosphite stabilizer.

41. The composition of claim 38, wherein the additive comprises a mixture of pentaerythritol tetrastearate and a stabilizer selected from the group consisting of phosphite stabilizers, hindered phenol stabilizers, and combinations thereof.

42. The composition of claim 38, wherein the particulate glass filler is a glass flake and the glass fiber is fiberglass.

* * * * *